(12) United States Patent
Fujinami et al.

(10) Patent No.: US 10,030,178 B2
(45) Date of Patent: Jul. 24, 2018

(54) HOT-MELT ADHESIVE

(71) Applicant: IDEMITSU KOSAN CO., LTD., Chiyoda-ku (JP)

(72) Inventors: Hiroki Fujinami, Narashino (JP); Kenji Kobayashi, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 17 days.

(21) Appl. No.: 15/127,117

(22) PCT Filed: Mar. 20, 2015

(86) PCT No.: PCT/JP2015/058529
§ 371 (c)(1),
(2) Date: Sep. 19, 2016

(87) PCT Pub. No.: WO2015/146845
PCT Pub. Date: Oct. 1, 2015

(65) Prior Publication Data
US 2018/0030317 A1    Feb. 1, 2018

(30) Foreign Application Priority Data

Mar. 25, 2014 (JP) ................. 2014-062687

(51) Int. Cl.
| | | |
|---|---|---|
| *C09J 123/12* | (2006.01) | |
| *C09J 123/10* | (2006.01) | |
| *C09J 11/06* | (2006.01) | |
| *C09J 123/00* | (2006.01) | |
| *C09J 123/16* | (2006.01) | |

(52) U.S. Cl.
CPC .............. *C09J 123/12* (2013.01); *C09J 11/06* (2013.01); *C09J 123/10* (2013.01); *C09J 123/00* (2013.01); *C09J 123/16* (2013.01)

(58) Field of Classification Search
CPC ........ C09J 123/10; C09J 11/06; C09J 123/00; C09J 123/16
See application file for complete search history.

(56) References Cited

U.S. PATENT DOCUMENTS

| 5,965,657 A | 10/1999 | Voegtli et al. |
|---|---|---|
| 2005/0159566 A1 | 7/2005 | Minami et al. |
| 2014/0147669 A1 | 5/2014 | Thatcher et al. |
| 2014/0199545 A1* | 7/2014 | Moriguchi et al. .... C09J 123/12 |
| | | 428/349 |
| 2014/0199907 A1 | 7/2014 | Moriguchi et al. |
| 2017/0260430 A1 | 9/2017 | Moriguchi et al. |

FOREIGN PATENT DOCUMENTS

| CN | 101084286 A | 12/2007 |
|---|---|---|
| JP | 2011-236330 A | 11/2011 |
| JP | 2012-72302 A | 4/2012 |
| JP | 2013-64054 A | 4/2013 |
| JP | 2013-64055 A | 4/2013 |
| JP | 2014-43520 A | 3/2014 |
| WO | 2003/091289 A1 | 11/2003 |
| WO | 2013/019507 A2 | 2/2013 |
| WO | WO 2013/039261 A1 | 3/2013 |
| WO | WO 2014/014491 A1 | 1/2014 |
| WO | WO 2014/034916 A1 | 3/2014 |
| WO | 2014/077258 A1 | 5/2014 |

OTHER PUBLICATIONS

Extended European Search Report dated Sep. 22, 2017 in Patent Application No. 15769713.7.
International Search Report dated Jun. 9, 2015 in PCT/JP2015/058529 filed Mar. 20, 2015.
Combined Office Action and Search Report dated Dec. 8, 2017 in Chinese Patent Application No. 201580015640.2 (with English translation of categories of cited documents) citing documents AO-AQ therein, 9 pages.
Office Action dated Nov. 21, 2017 in Japanese Patent Application No. 2014-062687.

* cited by examiner

Primary Examiner — Nathan M Nutter
(74) Attorney, Agent, or Firm — Oblon, McClelland, Maier & Neustadt, L.L.P.

(57) ABSTRACT

Provided are a hot-melt adhesive having high flowability in a molten state and exhibiting high adhesion strength in bonding PP nonwoven fabrics and further exhibiting high adhesion strength in bonding PE film-PP nonwoven fabric, and a base polymer for a hot-melt adhesive. The hot-melt adhesive contains (A) a propylene-based polymer satisfying the following (Ai) to (Aiv), and (B) an olefin-based copolymer satisfying the following (Bi) and (Bii); and the base polymer for a hot-melt adhesive consists of a mixture of (A) a propylene-based polymer satisfying the following (Ai) to (Aiv) and (B) an olefin-based copolymer satisfying the following (Bi) and (Bii) and satisfies the following (1) and (2). (Ai) the melting point is 120° C. or lower, (Aii) the Mw is 10,000 to 150,000, (Aiii) the Mw/Mn is 2.5 or less, (Aiv) the penetration is 8 or less, (Bi) the penetration is 15 or more, (Bii) the melting point is 90° C. or higher, (1) the tensile elastic modulus at 23° C. is 400 MPa or less, and (2) the semi-crystallization time at 23° C. is 20 minutes or less.

10 Claims, No Drawings

HOT-MELT ADHESIVE

TECHNICAL FIELD

The present invention relates to a hot-melt adhesive containing two kinds of olefin-based polymers.

BACKGROUND ART

A hot-melt adhesive is a solvent-free adhesive and has a characteristic that instant bonding and high-speed bonding can be achieved since adhesiveness is exhibited after the adhesive is melted by heating and applied onto an adherend, followed by cooling to solidify the adhesive, and therefore has been used in a wide range of fields. Not only adherends to be bonded with such a hot-melt adhesive but also the conditions of use thereof are various. At present, various hot-melt adhesives for use in various applications have been developed and supplied to the market. Also for the conditions of use, various operating temperatures ranging from low temperatures to high temperatures are taken into consideration.

A propylene-based polymer has heretofore been used as a base polymer for hot-melt adhesives. Above all, a low-molecular-weight polypropylene produced through polymerization using a metallocene catalyst has a high flowability and is excellent in coatability when used as a hot-melt adhesive, excellent in adhesion strength with a low-polar substance such as polypropylene or the like and excellent in thermal stability in a molten state under heat, and can be therefore favorably used as a base polymer for various hot-melt adhesives (PTL 1). In particular, the polymer is suitable for spray coating for use in constructing hygiene products such as paper diapers, sanitary goods, etc.

CITATION LIST

Patent Literature

PTL 1: WO 03/091289

SUMMARY OF INVENTION

Technical Problem

However, the hot-melt adhesive that contains polypropylene as a base polymer described in PTL 1 exhibits high adhesion strength in bonding polypropylene-made nonwoven fabrics (hereinafter this may be referred to as "PP nonwoven fabrics"), but is required to be improved more in point of the adhesion strength with other materials constituting hygiene products, especially PE-made films (hereinafter this may be referred to as "PE films").

An object of the present invention is to provide a hot-melt adhesive exhibiting high adhesion strength in bonding PP nonwoven fabrics and further exhibiting high adhesion strength in bonding PE film-PP nonwoven fabric, and to provide a base polymer for a hot-melt adhesive.

Solution to Problem

The present invention relates to the following [1] to [12].
[1] A hot-melt adhesive containing (A) a propylene-based polymer satisfying the following (Ai) to (Aiv), and (B) an olefin-based copolymer satisfying the following (Bi) and (Bii):

(Ai) the melting point is 120° C. or lower,
(Aii) Mw is 10,000 to 150,000,
(Aiii) Mw/Mn is 2.5 or less,
(Aiv) the penetration is 8 or less,
(Bi) the penetration is 15 or more, and
(Bii) the melting point is 90° C. or higher.

[2] The hot-melt adhesive according to [1], wherein the olefin-based copolymer (B) further satisfies (Biii):
(Biii) Mw/Mn is 2.5 or more and 6.0 or less.

[3] The hot-melt adhesive according to [1] or [2], wherein the olefin-based copolymer (B) is a copolymer of propylene and at least one selected from ethylene and an α-olefin having 4 to 24 carbon atoms.

[4] The hot-melt adhesive according to any of [1] to [3], wherein the olefin-based copolymer (B) is a copolymer of propylene, ethylene and 1-butene.

[5] The hot-melt adhesive according to any of [1] to [4], wherein the melting point of the propylene-based polymer (A) is 110° C. or lower.

[6] The hot-melt adhesive according to any of [1] to [5], wherein the melting point of the olefin-based copolymer (B) is 90 to 160° C.

[7] The hot-melt adhesive according to any of [1] to [6], wherein the ratio by mass of the propylene-based polymer (A) to the olefin-based copolymer (B) [(A)/(B)] is 99/1 to 50/50.

[8] The hot-melt adhesive according to any of [1] to [7], further containing at least one selected from (C) a tackifier resin, (D) an oil and (E) a wax.

[9] The hot-melt adhesive according to any of [1] to [8], wherein the mixture of the propylene-based polymer (A) and the olefin-based copolymer (B) satisfies the following (1) and (2):
(1) the tensile elastic modulus at 23° C. is 400 MPa or less,
(2) the semi-crystallization time at 23° C. is 20 minutes or less.

[10] The hot-melt adhesive according to any of [1] to [9], wherein the mixture of the propylene-based polymer (A) and the olefin-based copolymer (B) satisfies the following (3):
(3) the elongation at break at 23° C. is 150% or more and 1,000% or less.

[11] A base polymer for a hot-melt adhesive, which consists of a mixture of (A) a propylene-based polymer satisfying the following (Ai) to (Aiv) and (B) an olefin-based copolymer satisfying the following (Bi) and (Bii), and which satisfies the following (1) and (2):
(Ai) the melting point is 120° C. or lower,
(Aii) Mw is 10,000 to 150,000,
(Aiii) Mw/Mn is 2.5 or less,
(Aiv) the penetration is 8 or less,
(Bi) the penetration is 15 or more,
(Bii) the melting point is 90° C. or higher,
(1) the tensile elastic modulus at 23° C. is 400 MPa or less, and
(2) the semi-crystallization time at 23° C. is 20 minutes or less.

[12] The base polymer for a hot-melt adhesive according to [11], satisfying the following (3):
(3) the elongation at break at 23° C. is 150% or more and 1,000% or less.

Advantageous Effects of Invention

According to the present invention, there can be provided a hot-melt adhesive having high flowability in a molten state, exhibiting high adhesion strength in bonding PP nonwoven fabrics, and further exhibiting high adhesion strength in bonding PE film-PP nonwoven fabric.

DESCRIPTION OF EMBODIMENTS

The hot-melt adhesive of the present invention contains (A) a propylene-based polymer satisfying the following (Ai) to (Aiv), and (B) an olefin-based copolymer satisfying the following (Bi) and (Bii):
    (Ai) the melting point is 120° C. or lower,
    (Aii) Mw is 10,000 to 150,000,
    (Aiii) Mw/Mn is 2.5 or less,
    (Aiv) the penetration is 8 or less,
    (Bi) the penetration is 15 or more, and
    (Bii) the melting point is 90° C. or higher.

[(A) Propylene-Based Polymer]

The propylene-based polymer (A) satisfies the following (Ai) to (Aiv):
    (Ai) the melting point is 120° C. or lower,
    (Aii) Mw is 10,000 to 150,000,
    (Aiii) Mw/Mn is 2.5 or less, and
    (Aiv) the penetration is 8 or less.

The above (Ai) to (Aiv) are measured according to the methods described in the section of Examples.

The propylene-based polymer (A) for use in the present invention is preferably at least one selected from a propylene homopolymer and a copolymer of propylene and any other olefin, and more preferably a propylene homopolymer. The other olefin than propylene to be contained in the propylene-based polymer (A) includes ethylene and an α-olefin having 4 or more carbon atoms, and is more preferably ethylene. The content of the other olefin is preferably 5% by mass or less, more preferably 3% by mass or less, even more preferably 1% by mass or less, relative to the propylene-based polymer (A).

The α-olefin having 4 or more carbon atoms is preferably an α-olefin having 4 to 24 carbon atoms, more preferably an α-olefin having 4 to 12 carbon atoms, even more preferably an α-olefin having 4 to 8 carbon atoms. Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene, 1-eicosene, etc. In the present invention, one or more of these may be used.

More specific examples of the copolymer of propylene and any other olefin include at least one selected from a propylene-ethylene copolymer and a propylene-α-olefin copolymer where the α-olefin has 4 or more carbon atoms.

(Ai) Melting Point

The (Ai) melting point of the propylene-based polymer (A) is 120° C. or lower. When the melting point is 120° C. or lower, the adhesion strength between nonwoven fabrics is excellent.

The melting point of the propylene-based polymer (A) is preferably 110° C. or lower, more preferably 100° C. or lower, for realizing excellent adhesion strength between nonwoven fabrics. The melting point is, for easy handling, preferably 0° C. or higher, more preferably 40° C. or higher.

(Aii) Weight-Average Molecular Weight (Mw)

The (Aii) Mw (weight-average molecular weight) of the propylene-based polymer (A) is 10,000 to 150,000. When the Mw is 10,000 to 150,000, the adhesion strength between nonwoven fabrics is excellent.

The (Aii) Mw of the propylene-based polymer (A) is, for realizing excellent adhesion strength between nonwoven fabrics, preferably 20,000 to 130,000, more preferably 20,000 to 100,000.

(Aiii) Mw/Mn

The Mw/Mn (weight-average molecular weight/number-average molecular weight) of the propylene-based polymer (A) is 2.5 or less. When the Mw/Mn is 2.5 or less, the adhesion strength between nonwoven fabrics is excellent.

The (Aiii) Mw/Mn of the propylene-based polymer (A) is, for realizing excellent adhesion strength between nonwoven fabrics, preferably 2.4 or less, more preferably 2.2 or less. In turn, Mw/Mn is preferably 1.2 or more, more preferably 1.5 or more.

(Aiv) Penetration (Aiv) penetration of the propylene-based polymer (A) is 8 or less. When the penetration is 8 or less, the adhesion strength between nonwoven fabrics is excellent The (Aiv) penetration of the propylene-based polymer (A) is, for realizing excellent adhesion strength between nonwoven fabrics, preferably 7 or less, more preferably 5 or less. In turn, the penetration is preferably 1 or more, more preferably 2 or more.

In the present invention, the penetration is a value determined according to the following method.

[Penetration]

Measurement method: According to JIS K2235, the length (mm) of a needle having penetrated vertically into the sample kept at 25° C. is multiplied by 10 times to obtain the penetration.

(Production Method for Propylene-Based Polymer (A))

The production method for the propylene-based polymer (A) includes a method of homopolymerizing propylene using a metallocene catalyst to produce a propylene homopolymer, and a method of copolymerizing propylene and ethylene and/or an α-olefin having 4 or more carbon atoms to produce a propylene copolymer.

The metallocene catalyst includes transition metal compounds having one or more ligands of a cyclopentadienyl group, a substituted cyclopentadienyl group, an indenyl group, a substituted indenyl group and the like, and catalysts of a combination of the transition metal compound where the ligands are geometrically controlled and a promoter, as described in JP-A 58-19309, 61-130314, 3-163088, 4-300887, 4-211694, and JP-T 1-502036, etc.

Among the metallocene catalysts, transition metal compounds where the ligands form a crosslinked structure via a crosslinking group are preferred, and above all, a method of using a metallocene catalyst prepared by combining a transition metal compound that forms a crosslinked structure via two crosslinking groups and a promoter is more preferred. Examples described in the paragraphs [0037] to [0084] in JP-A 2001-172325 are preferred examples for use in the present invention.

Examples of commercial products of the above-mentioned propylene-based polymer include "L-MODU S400", a trade name available from Idemitsu Kosan Co., Ltd.

The content of the propylene-based polymer (A) is, for realizing excellent adhesion strength between nonwoven fabrics, preferably 1 to 80 parts by mass, more preferably 20 to 70 parts by mass, even more preferably 30 to 60 parts by mass, relative to 100 parts by mass of the hot-melt adhesive.

[Olefin-Based Copolymer (B)]

The olefin-based copolymer (B) satisfies the following (Bi) and (Bii), and preferably further satisfies (Biii), and more preferably further satisfies (Biv). When the penetration of the olefin-based copolymer (B) is 15 or more, a hot-melt adhesive having high adhesion strength in bonding PE film-PP nonwoven fabric can be obtained.
    (Bi) The penetration is 15 or more,
    (Bii) the melting point is 90° C. or higher, (Biii) Mw/Mn is 2.5 or more and 6 or less, and
(Biv) Mw is 10,000 to 150,000.

The methods for measuring the above (Bi) to (Biv) are described in the section of Examples.

The olefin-based copolymer (B) for use in the present invention is preferably a copolymer of at least two selected from ethylene and an α-olefin, and is more preferably a copolymer of ethylene, propylene and any other olefin.

The other olefin than propylene contained in the olefin-based copolymer (B) is at least one selected from ethylene and an α-olefin having 4 or more carbon atoms, more preferably at least one selected from ethylene and an α-olefin having 4 to 24 carbon atoms.

The α-olefin having 4 or more carbon atoms is preferably an α-olefin having 4 to 24 carbon atoms, more preferably an α-olefin having 4 to 20 carbon atoms, even more preferably an α-olefin having 4 to 12 carbon atoms, still more preferably an α-olefin having 4 to 8 carbon atoms. Specific examples of the α-olefin include 1-butene, 1-pentene, 4-methyl-1-pentene, 1-hexene, 1-octene, 1-decene, 1-dodecene, 1-tetradecene, 1-hexadecene, 1-octadecene, 1-eicosene, etc. Among these, 1-butene is preferred. In the present invention, one or more of these may be used.

More specifically, the olefin-based copolymer (B) is preferably a copolymer of propylene and at least one selected from ethylene and an α-olefin having 4 to 24 carbon atoms, more preferably a copolymer of propylene, ethylene and an α-olefin having 4 to 24 carbon atoms, even more preferably a copolymer of propylene, ethylene and 1-butene.

In the olefin-based copolymer (B), the amount of the structural unit derived from propylene is preferably 30 to 90 mol %, more preferably 40 to 80 mol %, even more preferably 50 to 80 mol %.

In the olefin-based copolymer (B), the amount of the structural unit derived from ethylene is, for improving the adhesion strength between a PE film and a nonwoven fabric, preferably 1 to 30 mol %, more preferably 6 to 25 mol %, even more preferably 8 to 20 mol %.

In the olefin-based copolymer (B), the amount of the structural unit derived from an α-olefin having 4 to 24 carbon atoms is, for improving the adhesion strength between a PE film and a nonwoven fabric, preferably 1 to 30 mol %, more preferably 5 to 23 mol %, even more preferably 10 to 20 mol %.

(Bi) Penetration (Bi) penetration of the olefin-based copolymer (B) is 15 or more. When the penetration is 15 or more, the adhesion strength between a PE film and a nonwoven fabric is excellent.

The (Bi) penetration of the olefin-based copolymer (B) is, for realizing excellent adhesion strength between a PE film and a nonwoven fabric, more preferably 17 or more, even more preferably 20 or more. In turn, the (Bi) penetration is, for realizing adhesion strength between a nonwoven fabric and a nonwoven fabric, preferably 50 or less, more preferably 30 or less.

(Bii) Melting Point (Bii) melting point of the olefin-based copolymer (B) is 90° C. or higher. When the melting point is 90° C. or higher, the adhesion strength between a PE film and a nonwoven fabric is excellent.

The (Bii) melting point of the olefin-based copolymer (B) is, for realizing excellent adhesion strength between a PE film and a nonwoven fabric, more preferably 95° C. or higher, even more preferably 100° C. or higher. In turn, the melting point (Bii) is, for realizing excellent adhesion strength between a PE film and a nonwoven fabric, preferably 160° C. or lower, more preferably 130° C. or lower, even more preferably 120° C. or lower.

(Biii) Mw/Mn (Biii) Mw/Mn (weight-average molecular weight/number-average molecular weight) of the olefin-based copolymer (B) is preferably 2.5 or more and 6.0 or less. When the Mw/Mn is 2.5 or more and 6.0 or less, the flowability and the coatability in a molten state is excellent.

The (Biii) Mw/Mn of the olefin-based copolymer (B) is, for realizing excellent coatability, more preferably 3.0 or more and 5.5 or less.

(Biv) Weight-Average Molecular Weight (Mw)

(Biv) Mw (weight-average molecular weight) of the olefin-based copolymer (B) is preferably 10,000 to 150,000. When the Mw is 10,000 to 150,000, the adhesion strength between a nonwoven fabric and a nonwoven fabric is excellent.

The (Biv) Mw of the olefin-based copolymer (B) is, for realizing excellent adhesion strength between a nonwoven fabric and a nonwoven fabric, more preferably 20,000 to 130,000, even more preferably 20,000 to 100,000.

(Production Method for Olefin-Based Copolymer (B))

The production method for the olefin-based copolymer (B) is not specifically limited, for which there is mentioned a method for producing the copolymer through polymerization of at least two selected from ethylene and an α-olefin using a Ziegler-Natta catalyst.

Commercial products of the above-mentioned olefin-based copolymer (B) include "VESTOPLAST 704" a trade name available from Evonik Corporation, etc.

The content of the olefin-based copolymer (B) is, for realizing excellent adhesion strength between nonwoven fabrics, preferably 1 to 40 parts by mass, more preferably 5 to 30 parts by mass, even more preferably 10 to 20 parts by mass, relative to 100 parts by mass of the hot-melt adhesive.

[Mixture of Propylene-Based Polymer (A) and Olefin-Based Copolymer (B)]

The ratio by mass of the propylene-based polymer to the olefin-based copolymer [(A)/(B)] is preferably 99/1 to 50/50, more preferably 90/10 to 60/40, even more preferably 80/20 to 70/30, for realizing high flowability in a molten state, high adhesion strength between PP nonwoven fabrics, and high adhesion strength between a PE film and a PP nonwoven fabric.

In the above, the mixture of the propylene-based polymer (A) and the olefin-based copolymer (B) (hereinafter this may be referred to as "base polymer") preferably satisfies the following (1) and (2), and more preferably further satisfies the following (3).

(1) The tensile elastic modulus at 23° C. is 400 MPa or less.

(2) The semi-crystallization time at 23° C. is 20 minutes or less.

(3) The elongation at break at 23° C. is 150% or more and 1,000% or less.

The base polymer is favorably used as a base polymer for a hot-melt adhesive.

(1) Tensile Elastic Modulus

From the viewpoint of the followability of the hot-melt adhesive to an adherend, the viewpoint of the adhesiveness thereof to surface irregularities of an adherend, and the viewpoint of the anchoring effect thereof to surface irregularities of an adherend, the adhesive preferably has suitable softness. From these viewpoints, the tensile elastic modulus at 23° C. of the base polymer is preferably 400 MPa or less, more preferably 350 MPa or less, even more preferably 300

MPa or less, still more preferably 250 MPa or less, further more preferably 200 MPa or less, still further more preferably 150 MPa or less.

From the viewpoint of adhesiveness, the tensile elastic modulus is preferably lower, and its lower limit is not limited, or the detection limit value may be the lower limit. Specifically, the tensile elastic modulus is preferably 1 MPa or more, more preferably 5 MPa or more, even more preferably 10 MPa or more.

The tensile elastic modulus of the base polymer in the present invention may be measured according to the method described in the section of Examples.

The tensile elastic modulus of the base polymer in the present invention can be controlled to fall within a desired range by varying the polymerization conditions (reaction temperature, reaction time, catalyst, promoter) for the propylene-based polymer (A) and by varying the components of the olefin-based copolymer (B) and the polymerization conditions and the blending amount thereof.

(2) Semi-Crystallization Time

The semi-crystallization time in the present invention refers to a time from the start of isothermal crystallization until the integral value of the calorific value becomes 50% when the integral value of the calorific value from the start of isothermal crystallization until the completion of crystallization is taken as 100%.

If the semi-crystallization time is too long, the solidification time of the hot-melt adhesive is too long (the solidification rate is low), and therefore, it is not suitable as the hot-melt adhesive. From such a viewpoint, the semi-crystallization time at 23° C. of the base polymer is preferably 20 minutes or less, more preferably 15 minutes or less, even more preferably 12 minutes or less, still more preferably 10 minutes or less, further more preferably 5 minutes or less. From the viewpoint of the solidification rate of the hot-melt adhesive, the semi-crystallization time is preferably shorter, and the lower limit thereof is not particularly limited, and the detection limit value becomes the lower limit, but the detection limit varies depending on the measurement device. The detection limit value in a device to be used for the method described in Examples of this description is 1 minute.

The semi-crystallization time of the base polymer in the present invention is measured by the method described in Examples.

The semi-crystallization time of the base polymer in the present invention can be controlled to fall within a desired range by varying the polymerization conditions (reaction temperature, reaction time, catalyst, promoter) for the propylene-based polymer (A) and by varying the components of the olefin-based copolymer (B) and the polymerization conditions and the blending amount thereof.

(3) Elongation at Break

From the viewpoint of the adhesion strength between the hot-melt adhesive and an adherend and in order to bring the hot-melt adhesive into close contact with the surface irregularities of the adherend, it is preferred that the hot-melt adhesive is moderately soft. On the other hand, if the hot-melt adhesive is too soft, it is easily peeled off. From such a viewpoint, the elongation at break at 23° C. of the base polymer is preferably 150% or more, more preferably 300% or more, even more preferably 500% or more, still more preferably 700% or more, further more preferably 800% or more, and also preferably 1,200% or less, more preferably 1,000% or less, even more preferably 900% or less.

The elongation at break of the base polymer in the invention is measured by the method described in Examples.

The elongation at break of the base polymer can be controlled to fall within a desired range by varying the polymerization conditions (reaction temperature, reaction time, catalyst, promoter) for the propylene-based polymer (A) and by varying the components of the olefin-based copolymer (B) and the polymerization conditions and the blending amount thereof.

[Hot-Melt Adhesive]

The hot-melt adhesive of the present invention contains the propylene-based polymer (A) and the olefin-based copolymer (B) and may contain at least one selected from (C) a tackifier resin, (D) an oil and (E) a wax, as needed.

Further, the hot-melt adhesive of the present invention may contain a variety of additives such as a plasticizer, an inorganic filler, an antioxidant, etc., as needed.

In particular, the base polymer in the present invention has excellent applicability to the hot-melt adhesive and can be used for controlling the solidification rate or the melt viscosity thereof. In addition, the improvement of handleability and the like owing to the prevention of bleeding (seepage) of an oil, suppression of sticky feeling, etc. can be obtained. For example, it is considered that when a base polymer having a low tensile elastic modulus is added, the open time can be prolonged, and when a base polymer having a high tensile elastic modulus is added, the set time can be shortened.

(Tackifier Resin (C))

Examples of the tackifier resin (C) include materials which are composed of a hydrogenated derivative of an aliphatic petroleum hydrocarbon resin, a rosin derivative resin, a polyterpene resin, a petroleum resin, an oil-soluble phenolic resin or the like and are in the form of a solid, a semi-solid, or a liquid at room temperature. Among these materials, one type may be used alone or two or more types may be used in combination. In the present invention, in consideration of the compatibility with the base polymer, it is preferred to use a hydrogenated material. In particular, a hydrogenated petroleum resin material having excellent heat stability is more preferred.

Examples of commercially available products of the tackifier resin (C) include I-MARV P-125, I-MARV P-100, and I-MARV P-90 (all manufactured by Idemitsu Kosan Co., Ltd.), Yumex 1001 (manufactured by Sanyo Chemical Industries, Ltd.), Hi-Rez T 1115 (manufactured by Mitsui Chemicals, Incorporated), Clearon K 100 (manufactured by Yasuhara Chemical Co., Ltd.), ECR 227, Escorez 2101, and Escorez 5000 series (all manufactured by Tonex Co., Ltd.), Arkon P100 (manufactured by Arakawa Chemical Industries, Ltd.), and Regalrez 1078 (manufactured by Hercules, Inc.) (all are trade names).

From the viewpoint of the improvement of the adhesiveness and also the improvement of the coatability and the wettability to an adherend due to a decrease in the viscosity, the content of the tackifier resin (C) in the hot-melt adhesive of the present invention is preferably 20 to 200 parts by mass, more preferably 30 to 150 parts by mass, even more preferably 50 to 120 parts by mass, relative to 100 parts by mass of the base polymer.

(Oil (D))

Examples of the oil (D) include paraffin-based process oils and naphthene-based process oils. Examples of commercially available products of the oil (D) include Diana Process Oil PW-90 (trade name, manufactured by Idemitsu Kosan Co., Ltd.), etc.

From the viewpoint of the improvement of the adhesiveness and also the improvement of the coatability and the wettability to an adherend due to a decrease in the viscosity, the content of the oil (D) in the hot-melt adhesive of the present invention is preferably 5 to 200 parts by mass, more preferably 10 to 100 parts by mass, even more preferably 20 to 50 parts by mass relative to 100 parts by mass of the base polymer.

(Wax (E))

Examples of the wax (E) include animal waxes, vegetable waxes, carnauba waxes, candelilla waxes, Japan waxes, beeswaxes, mineral waxes, petroleum waxes, paraffin waxes, microcrystalline waxes, petrolatum, higher fatty acid waxes, higher fatty acid ester waxes, Fischer-Tropsch waxes, etc.

The content of the wax (E) in the hot-melt adhesive of the present invention is, from the viewpoint of the improvement of the adhesiveness and also the improvement of the coatability and the wettability to an adherend due to a decrease in the viscosity, preferably 0 to 100 parts by mass, more preferably 1 to 50 parts by mass, even more preferably 5 to 30 parts by mass relative to 100 parts by mass of the base polymer.

(Other Additives)

Examples of the plasticizer include phthalates, adipates, fatty acid esters, glycols, epoxy-based polymer plasticizers, etc.

Examples of the inorganic filler include clay, talc, calcium carbonate, barium carbonate, etc.

Examples of the antioxidant include phosphorus-based antioxidants such as trisnonylphenyl phosphite, distearyl pentaerythritol diphosphite, Adekastab 1178 (manufactured by Adeka Corporation), Sumilizer TNP (manufactured by Sumitomo Chemical Co., Ltd.), Irgafos 168 (manufactured by BASF Co., Ltd.), Sandstab P-EPQ (manufactured by Sandoz K.K.), etc.; phenolic antioxidants such as 2,6-t-butyl-4-methylphenol, n-octadecyl-3-(3',5'-di-t-butyl-4'-hydroxyphenyl)propionate, Sumilizer BHT (manufactured by Sumitomo Chemical Co., Ltd.), Irganox 1010 (manufactured by BASF Co., Ltd.), etc.; and sulfur-based antioxidants such as dlilauryl-3,3'-thiodipropionate, pentaerythritol-tetrakis(3-laurylthiopropionate), Sumilizer TPL (manufactured by Sumitomo Chemical Co., Ltd.), Yoshinox DLTP (manufactured by Yoshitomi Pharmaceutical Industries, Ltd.), AntiOx L (manufactured by NOF Corporation), etc.

[Production Method for Hot-Melt Adhesive]

The hot-melt adhesive of the present invention can be produced by dry-blending the propylene-based polymer (A) and the olefin-based copolymer (B) as the base polymer, and preferably along with the tackifier resin (C) and the oil (D) and optionally other various additives as needed, using a Henschel mixer or the like, and melt-kneading the components using a single-screw or twin-screw extruder, a Plastomill, a Banbury mixer, or the like.

The hot-melt adhesive of the present invention has a melt viscosity at 160° C. of preferably 12,000 mPa·s or less, more preferably 1,000 to 10,000 mPa·s, even more preferably 2,000 to 8,000 mPa·s. The melt viscosity is measured according to the method described in Examples.

The hot-melt adhesive of the present invention is excellent in adhesiveness to various types of substrates containing a low-polar substance such as polyolefins, etc., and is also excellent in heat stability in hot melting, and is therefore favorably used for, for example, hygiene materials, packaging materials, bookbinding materials, fibrous products, wood works, electric materials, can production materials, building materials, bag-making materials, etc.

In particular, the adhesive is favorably used for bonding polyolefin-based materials, for example, bonding a polyolefin nonwoven fabric and a polyolefin nonwoven fabric, or bonding a polyolefin film and a polyolefin nonwoven fabric, preferably for bonding a PP nonwoven fabric and a PP nonwoven fabric, or a PE film and a PP nonwoven fabric.

EXAMPLES

In Examples in this description, various physical properties were measured according to the following methods.

[Melting Point]

Using a differential scanning calorimeter (manufactured by PerkinElmer Co., Ltd., DSC-7), 10 mg of a sample was kept in a nitrogen atmosphere at −10° C. for 5 minutes, and then heated at 10° C./min. The peak top of a peak observed on the highest temperature side in the melting endothermic curve of the sample was defined as the melting point (Tm−D) of the sample.

[Weight-Average Molecular Weight (Mw) and Molecular Weight Distribution (Mw/Mn)]

According to the gel permeation chromatography (GPC) method, the weight-average molecular weight (Mw) and the molecular weight distribution (Mw/Mn) were determined. In the measurement, the following device was used under the following conditions, and the weight-average molecular weight in terms of polystyrene was determined.

<GPC Measuring Device>

Column: TOSO GMHHR-H(S)HT

Detector: RI detector for liquid chromatography, Waters 150 C

<Measurement Conditions>

Solvent: 1,2,4-trichlorobenzene

Measurement temperature: 145° C.

Flow rate: 1.0 mL/min

Sample concentration: 2.2 mg/mL

Injection amount: 160 μL

Calibration curve: Universal Calibration

Analysis software: HT-GPC (ver. 1.0)

[Penetration]

Measurement Method:

According to JIS K2235, the length (mm) of a needle having penetrated vertically into the sample kept at 25° C. was multiplied by 10 times to obtain the penetration.

Physical properties of various polymers were measured according to the above-mentioned methods. The results are shown in Table 1.

TABLE 1

|  | Propylene-based Polymer (A) | Olefin-based Copolymer (B-1) 704 | Olefin-based Copolymer (B-2) 703 |
| --- | --- | --- | --- |
| Mw | 47,000 | 36,300 | 38,500 |
| $M_w/M_n$ | 1.8 | 5.16 | 6.19 |
| Melting Point (° C.) | 82 | 113 | 96 |
| Penetration | 4 | 21 | 10 |

Propylene-Based Polymer (A)

Manufactured by Idemitsu Kosan Co., Ltd., propylene homopolymer, trade name "L-MODU S400".

Olefin-Based Copolymer (B-1)

Propylene/ethylene/1-butene copolymer obtained through polymerization with a Ziegler-Natta catalyst [ethylene-derived structural unit amount (mass %)/propylene-derived structural unit amount (mass %)/1-butene-derived structural unit amount (mass %)=12/70/18], manufactured by Evonik Corporation, trade name "VESTOPLAST 704".

Olefin-Based Copolymer (B-2)

Propylene/ethylene/1-butene copolymer obtained through polymerization with a Ziegler-Natta catalyst [ethylene-derived structural unit amount (mass %)/propylene-derived structural unit amount (mass %)/1-butene-derived structural unit amount (mass %)=5/71/24], manufactured by Evonik Corporation, trade name "VESTOPLAST 703".

[Production of Resin Composition for Hot-Melt Adhesive]

Components (A) to (D) were blended in the ratio (part by mass) shown in Table 1, put into a 1-liter stainless container, melted by heating with a mantle heater at 180° C. for 30 minutes, and then fully stirred with a rotary vane to produce hot-melt adhesives of Example 1 and Comparative Examples 1 and 2. Mixtures of the component (A) and the component (B) (base polymers) were measured for the physical properties, and the measured properties thereof are shown in Table 2.

TABLE 2

| | | Example 1 | Comparative Example 1 | Comparative Example 2 |
|---|---|---|---|---|
| Components of Hot-Melt Adhesive (part by mass) | (A) Propylene-based Polymer | 41 | 55 | 41 |
| | (B-1) Olefin-based Copolymer | 14 | — | — |
| | (B-2) Olefin-based Copolymer | — | — | 14 |
| | (C) Tackifier Resin | 30 | 30 | 30 |
| | (D) Oil | 15 | 15 | 15 |
| Physical Properties of Base Polymer*1 | Tensile Elastic Modulus at 23° C. (MPa) | 51 | 89 | 56 |
| | Semi-crystallization Time at 23° C. (min) | 2 | 14 | 1 |
| | Elongation at break at 23° C. (%) | 830 | 620 | 790 |

*1: Mixture of component (A) and component (B).

(C) Tackifier Resin

Hydrogenated alicyclic hydrocarbon resin, ESCOREZ 5300, manufactured by Exxon Mobile Chemical Corporation.

(D) Oil

Paraffin-based process oil, manufactured by Idemitsu Kosan Co., Ltd., Diana Process Oil PW-90.

<Tensile Elastic Modulus>

The base polymer shown in Table 2 was press-molded to prepare a test piece, and according to JIS K 7113, the tensile elastic modulus of the test piece was measured under the following conditions.

Test piece (No. 2 dumbbell) thickness: 1 mm
Cross head speed: 100 mm/min
Load cell: 100 N
Measurement temperature: 23° C.

<Semi-Crystallization Time>

Using a differential scanning calorimeter (manufactured by PerkinElmer Co., Ltd., trade name "DSC 8500"), the time was measured according to the following method.

Each base polymer shown in Table 2 was melted by heating at 220° C. for 5 minutes and then cooled to 23° C. at 320° C./min, and in the process of isothermal crystallization at 23° C., the time-dependent change of the calorific value was measured, from which the semi-crystallization time was obtained.

<Elongation at Break>

Each base polymer shown in Table 2 was press-molded to prepare a test piece, and according to JIS K 7113, the elongation at break of the test piece was measured under the following conditions.

Test piece (JIS K7113-No. 2, 1/2-size dumbbell), thickness: 1 mm
Measurement temperature: 23° C.
Pulling rate: 100 mm/min
Chuck-to-chuck distance: 40 mm

[Evaluation of Hot-Melt Adhesive]

The melt viscosity of each hot-melt adhesive was measured. For the purpose of evaluating the adhesion performance of the hot-melt adhesive, a bonded test piece was prepared, and tested for the T-peel strength under the following conditions. The evaluation results are shown in Table 3.

TABLE 3

| | | Example 1 | Comparative Example 1 | Comparative Example 2 |
|---|---|---|---|---|
| T-peel Test | PE/NW [gf] | 199 | 90 | 124 |
| | NW/NW [gf] | 436 | 463 | 484 |
| Melt Viscosity (160° C.) [mPa·s] | | 2,700 | 3,700 | 2,720 |

[Production of Bonded Test Piece]

A spiral spray gun supplied by Nordson KK was set in a HMA coater system supplied by MEC Co., Ltd., and a coating substrate coated with a hot-melt adhesive was bonded to a bonding substrate to prepare a layered body.

As the coating substrate, a PP nonwoven fabric (SMS 3-layered, 17 g/m$^2$, 150 mm width) or an air-permeable PE film (20 g/m$^2$, 150 mm width) was used; and as the bonding substrate, a PP nonwoven fabric (same as above) was used. The two were bonded at a line speed of 150 m/min.

Regarding the coating condition for the spiral spray gun (nozzle diameter: about 0.5 mmφ), the melting temperature of the hot-melt adhesive was 150° C., the spray gun temperature was 150° C., and the hot air temperature was 180° C. The coating amount with the hot-melt adhesive was 5 g/m$^2$, and the hot air pressure was so controlled that the coated spiral width could be about 15 mm. The pressure with the press roller after the coating was 0.1 MPa, and the open time was about 0.1 seconds.

The layered body bonded with the hot-melt adhesive was cut to a 25 mm width in the vertical direction relative to the substrate traveling direction (CD direction) to give a test piece for T-peel strength measurement. The test piece was aged at 23° C. and 50% RH for 24 hours or more, and then tested for the T-peel strength thereof in the same environment.

In the Table, the PE film-PP nonwoven fabric adhesion strength test result is shown as [PE/NW], and the PP nonwoven fabric-PP nonwoven fabric adhesion strength test result is as [NW/NW].

[T-Peel Test]

In the T-peel test, Autograph AGS-X supplied by Shimadzu Corporation was used. In the peeling test, the peeling speed was 100 mm/min, and the peeling length was 30 mm, and two maximum values were averaged to calculate the mean value. With every hot-melt adhesive, 5 test pieces were tested, and the mean value of the top three test pieces was referred to as the peeling strength.

[Melt Viscosity]

According to JIS K-6862, each sample was measured at 160° C. using a Brookfield rotational viscometer.

In Comparative Example 1 where the propylene-based polymer (A) alone was used as the base polymer, the PE/NW adhesion strength was insufficient.

In Comparative Example 2 where a mixture of the propylene-based polymer (A) and the olefin-based copolymer (B-2) was used as the base polymer, the PE/NW adhesion strength was higher than that in Comparative Example 1, but the PE/NW adhesion strength was not still sufficient since the penetration of the component (B) was low.

In Example 1 where a mixture of the propylene-based polymer (A) and the olefin-based copolymer (B-1) was used as the base polymer, the PE/NW adhesion strength was higher than that in Comparative Example 2, and was good. This is considered to be because the penetration of the component (B) was high and therefore the adhesive was soft and had good adhesiveness to films.

INDUSTRIAL APPLICABILITY

The hot-melt adhesive of the present invention has high flowability and is excellent in coatability. In addition, the adhesive is excellent in adhesiveness to various types of substrates containing a low-polar substance such as polyolefins, etc., and is also excellent in heat stability in hot melting, and can be therefore favorably used for hygiene materials, packaging materials, bookbinding materials, fibrous products, wood works, electric materials, can production materials, building materials, bag-making materials, etc.

The invention claimed is:

1. A hot-melt adhesive, comprising:
   (A) a propylene-based polymer satisfying conditions (Ai) to (Aiv):
      (Ai) the melting point is 120° C. or lower,
      (Aii) Mw is 10,000 to 150,000,
      (Aiii) Mw/Mn is 2.5 or less,
      (Aiv) the penetration is 8 or less; and
   (B) an olefin-based copolymer satisfying conditions (Bi) and (Bii):
      (Bi) penetration is 15 or more, and
      (Bii) melting point is 90° C. or higher;
   wherein the olefin-based copolymer (B) is a copolymer of propylene, ethylene and 1-butene.

2. The hot-melt adhesive according to claim 1, wherein the olefin-based copolymer (B) further satisfies condition (Biii):
   (Biii) Mw/Mn is 2.5 or more and 6.0 or less.

3. The hot-melt adhesive according to claim 1, wherein the melting point of the propylene-based polymer (A) is 110° C. or lower.

4. The hot-melt adhesive according to claim 1, wherein the melting point of the olefin-based copolymer (B) is 90 to 160° C.

5. The hot-melt adhesive according to claim 1, wherein a ratio by mass of the propylene-based polymer (A) to the olefin-based copolymer (B) [(A)/(B)] is 99/1 to 50/50.

6. The hot-melt adhesive according to claim 1, further comprising at least one selected from the group consisting of (C) a tackifier resin, (D) an oil and (E) a wax.

7. The hot-melt adhesive according to claim 1, wherein a mixture of the propylene-based polymer (A) and the olefin-based copolymer (B) satisfies conditions (1) and (2):
   (1) tensile elastic modulus at 23° C. is 400 MPa or less, and
   (2) semi-crystallization time at 23° C. is 20 minutes or less.

8. The hot-melt adhesive according to claim 1, wherein a mixture of the propylene-based polymer (A) and the olefin-based copolymer (B) satisfies condition (3):
   (3) elongation at break at 23° C. is 150% or more and 1,000% or less.

9. A base polymer for a hot-melt adhesive, the base polymer comprising a mixture of
   (A) a propylene-based polymer satisfying conditions (Ai) to (Aiv):
      (Ai) the melting point is 120° C. or lower,
      (Aii) Mw is 10,000 to 150,000,
      (Aiii) Mw/Mn is 2.5 or less,
      (Aiv) the penetration is 8 or less; and
   (B) an olefin-based copolymer satisfying conditions (Bi) and (Bii):
      (Bi) the penetration is 15 or more,
      (Bii) the melting point is 90° C. or higher,
   and which satisfies conditions (1) and (2):
      (1) tensile elastic modulus at 23° C. is 400 MPa or less, and
      (2) semi-crystallization time at 23° C. is 20 minutes or less.

10. The base polymer according to claim 9, satisfying condition (3):
    (3) elongation at break at 23° C. is 150% or more and 1,000% or less.

* * * * *